US011941979B2

(12) United States Patent
Huang et al.

(10) Patent No.: US 11,941,979 B2
(45) Date of Patent: Mar. 26, 2024

(54) TRAFFIC LIGHT CONTROL METHOD FOR URBAN ROAD NETWORK BASED ON EXPECTED RETURN ESTIMATION

(71) Applicant: ZHEJIANG LAB, Zhejiang (CN)

(72) Inventors: Qian Huang, Hangzhou (CN); Kan Wu, Hangzhou (CN); Yongdong Zhu, Hangzhou (CN); Zhifeng Zhao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/349,980

(22) Filed: Jul. 11, 2023

(65) Prior Publication Data

US 2023/0351890 A1 Nov. 2, 2023

Related U.S. Application Data

(63) Continuation of application No. PCT/CN2022/094084, filed on May 20, 2022.

(30) Foreign Application Priority Data

Sep. 10, 2021 (CN) ......................... 202111059324.9

(51) Int. Cl.

| | |
|---|---|
| ***G08G 1/08*** | (2006.01) |
| ***G08G 1/01*** | (2006.01) |
| ***G08G 1/083*** | (2006.01) |

(52) U.S. Cl.

CPC ........... *G08G 1/083* (2013.01); *G08G 1/0112* (2013.01); *G08G 1/0125* (2013.01); *G08G 1/0145* (2013.01); *G08G 1/08* (2013.01)

(58) Field of Classification Search

CPC .... G08G 1/083; G08G 1/0112; G08G 1/0125; G08G 1/0145; G08G 1/08; G08G 1/0137; G08G 1/081

See application file for complete search history.

(56) References Cited

U.S. PATENT DOCUMENTS

| | | | | |
|---|---|---|---|---|
| 8,855,900 B2 * | 10/2014 | Lection | ................ | G08G 1/0145 340/928 |
| 2015/0015421 A1 | 1/2015 | Krijger et al. | | |
| 2022/0108611 A1 * | 4/2022 | Ho | ......................... | G08G 1/082 |

FOREIGN PATENT DOCUMENTS

| | | |
|---|---|---|
| CN | 106846867 A | 6/2017 |
| CN | 107507430 A | 12/2017 |

(Continued)

OTHER PUBLICATIONS

International Search Report (PCT/CN2022/094084); dated Aug. 18, 2022.

Notice Of Allowance(CN202111059324.9); dated Oct. 22, 2021.

*Primary Examiner* — Mohamed Barakat
*Assistant Examiner* — Sharmin Akhter
(74) *Attorney, Agent, or Firm* — W&G Law Group

(57) ABSTRACT

The present application discloses a traffic light control method for an urban road network based on expected return estimation, which uses C-V2X wireless communication technology to obtain real-time information of all vehicles and traffic state in the road network from vehicle-mounted terminals, and adaptively and dynamically controls the phase transformation of the traffic light. According to the present application, the expected returns of keeping the current phase and executing phase switch are calculated by estimating the timely driving distance and the future driving distance of the passable vehicles in the next green light duration in combination with the proposed road priority traffic index. By comparing the expected returns of keeping the current phase or switching to other phases, the best phase is selected, so as to make as many passable vehicles travel farther as possible in the next green light duration. Therefore, the efficiency of traffic will be improved.

9 Claims, 4 Drawing Sheets

(56) References Cited

FOREIGN PATENT DOCUMENTS

| | | | |
|---|---|---|---|
| CN | 109035832 | A | 12/2018 |
| CN | 109754617 | A | 5/2019 |
| CN | 110136455 | A | 8/2019 |
| CN | 110619752 | A | 12/2019 |
| CN | 111862633 | A | 10/2020 |
| CN | 112330962 | A | 2/2021 |
| CN | 113506442 | A | 10/2021 |
| WO | 2018115511 | A1 | 6/2018 |
| WO | 2019179107 | A1 | 9/2019 |

* cited by examiner

TRAFFIC LIGHT CONTROL METHOD FOR URBAN ROAD NETWORK BASED ON EXPECTED RETURN ESTIMATION

CROSS-REFERENCE TO RELATED APPLICATIONS

The present application is a continuation of International Application No. PCT/CN2022/094084, filed on May 20, 2022, which claims priority to Chinese Application No. 202111059324.9, filed on Sep. 10, 2021, the contents of both of which are incorporated herein by reference in their entireties.

TECHNICAL FIELD

The present application relates to the technical field of intelligent transportation, in particular to a traffic light control method for an urban road network based on expected return estimation.

BACKGROUND OF THE INVENTION

It is an important strategic decision made by the 19th National Congress of the Communist Party of China to become a powerful transportation country. It is an important task of intelligent transportation technology to form a safe, convenient, efficient, green and economical comprehensive transportation system. In today's society, people are not able to deviate traffic, and urban development is not able to deviate traffic, either. However, due to the increase of urban population, the existing traffic roads are increasingly blocked, and alleviating urban traffic congestion is an important task for the development of intelligent transportation. Due to the influence of morning and evening rush hours, the traditional traffic light control method, fixed timing method or manual adjustment method cannot dynamically adjust the traffic light timing according to the vehicle information on the road network, which often leads to traffic congestion in one direction and sparse traffic in the other direction. At present, there is a lack of effective means to obtain real-time and accurate information of traffic participants, which leads to insufficient control information of traffic lights and cannot generate effective traffic light timing solutions.

With the arrival of 5G, the wireless communication technology of Cellular Vehicle Networking (Cellular-V2X or C-V2X) has developed rapidly. Real-time information of road vehicles can be obtained by a vehicle-mounted OBU, and the effective use of real-time information of vehicles can help to realize a more efficient and reliable traffic light control solution.

SUMMARY OF THE INVENTION

In view of the shortcomings of the existing traffic signal control method of an urban road network, the object of the present application is to provide a traffic signal control method for an urban road network based on expected return estimation.

The object of the present application is achieved by the following technical solution: a traffic light control method for an urban road network based on expected return estimation, including the following steps:

Step 1, obtaining road information of the urban road network, including connectivity relation of all roads and current traffic light information of intersections.

It is assumed that each road includes lanes of three directions: turning left, going straight or turning right; a traffic light at each intersection includes four phases: phase 1: turn left on South-North direction, phase 2: go straight on South-North direction, phase 3: turn left on West-East direction, phase 4: go straight on West-East direction; the road information includes a length of the roads, assuming that maximum speed limits of all roads are the same, and a distance between a tail of a current road fleet and an upstream intersection.

Step 2, obtaining the information of all vehicles in the road network from vehicle-mounted terminals by Cellular-V2X, Cellular Vehicle Networking (C-V2X) wireless communication technology, including an instantaneous speed of a vehicle and a position on the road, which is expressed as a distance from the last intersection.

Step 3, obtaining current phase information for each intersection in the road network, calculating a total expected return of all incoming lanes that keep a current phase in a next traffic light cycle and a maximum total expected return of all incoming lanes that switch to the other three phases, and selecting an optimal phase after comparison.

If an executed phase in the next traffic light cycle is the same as the current phase, a green light duration of the vehicle is T; if the executed phase in the next traffic light cycle is different from the current phase, the green light duration of the vehicle is T−t, where t is a red light duration when the phase is switched; the total expected return of all incoming lanes is as follows:

(3.1) The expected return of each incoming lane is a sum of the timely driving distance of the vehicle in the lane and the future driving distance of the vehicle multiplied by a road priority index, and a sum of the expected returns of all incoming lanes is the total expected return of a certain phase; a calculation process of the timely driving distance of the vehicle is that firstly, a distance and time required for the vehicle to reach the intersection are calculated according to the driving speed of the vehicle, an acceleration of the vehicle, a maximum speed limit of the road, the length of the road and the distance from the upstream intersection; for all vehicles that can pass through the intersection, the driving distance of the vehicle within the green light duration is calculated.

(3.2) The distance that the vehicle still needs to travel to reach the intersection calculated in step (3.1) is added to the road length of an outgoing lane and then subtracted a queue length of the outgoing lane corresponding to the left, straight or right turn direction, and whether an obtained result is less than the driving distance of the vehicle within the green light duration is judged; if not, the timely driving distance of the vehicle is the driving distance of the vehicle within the green light duration, and the future driving distance of the vehicle is 0; if yes, the timely driving distance of the vehicle and the future driving distance of the vehicle are calculated according to the following formula:

$$\text{drive}_{distance-f} = d + L_2 - q_f$$

$$\text{future}_{distance-f} = \alpha * p * \frac{1}{L_2 - q_f} * (D_T - (d + L_2 - q_f))$$

where $\text{drive}_{distance-f}$ represents the timely driving distance of the vehicle in the outgoing lane, $\text{future}_{distance-f}$ represents the future driving distance of the vehicle in the outgoing lane. The outgoing lanes includes lanes in three directions: turning left, going straight or turning right, which is represented by f, and the vehicle enter one of the lanes with a certain probability. $q_f$ represents the queue length of the outgoing lane; d is the distance that the vehicle still needs to travel to reach the intersection, $L_2$ is the road length of the outgoing lane, and $D_T$ is the driving distance of the vehicle within the green light duration; p is a probability that the outgoing lane which the vehicle enters in at the downstream intersection is under the green light, and α is a loss coefficient of the future driving distance, which is an empirical coefficient.

(3.3) The timely driving distance and future driving distance of the vehicle in the three directions of turning left, going straight or turning right calculated in step (3.2) are respectively multiplied by the probability of the vehicle entered in the three directions of turning left, going straight or turning right, and a sum thereof is calculated to obtain the timely driving distances and the future driving distances of all vehicles that can pass through the intersection.

Further, in step 1, each intersection comprises a north-south dual-direction lane and an east-west dual-direction lane, and there are traffic lights at the intersection, including a green light and a red light, the green light for allowing passing, and the red light for forbidding passing.

Further, each phase comprises an incoming lane and three outgoing lanes, and the outgoing lanes comprise of the direction of turning left, and the vehicles to turn right are not controlled by the traffic lights and can turn right at any time.

Further, in step (3.1), the time $remain_{time}$ that the vehicle needs to travel to reach the intersection is calculated as follows:

$$remain_{time}=\begin{cases}\frac{-v+\sqrt{v^2+2a*d}}{a}, & \frac{V^2-v^2}{2*a}\geq d\\ \frac{V-v}{a}+\frac{d}{V}-\frac{V^2-v^2}{2*a*v}, & \frac{V^2-v^2}{2*a}<d\end{cases}$$

where v is the driving speed, a is the acceleration, and V is the maximum speed limit of the road where the vehicle is located; and when $remain_{time}$ is less than the green light duration, the vehicle can pass the current intersection.

Further, in step (3.1), the driving distance $D_T$ of the vehicle within the green light duration is calculated as follows:

$$D_T=\begin{cases}v*T'+\frac{a*T'^2}{2}, & \frac{V-v}{a}\geq T'\\ T'*v+\frac{(V-v)^2}{2*a}, & \frac{V-v}{a}<T'\end{cases}$$

where the value of T' is Tor T−t, and T' represents the green light duration.

Further, in step (3.1), the road priority index is calculated as follows:

$$priority_{factor}=normal(queue_{length})*normal(avg_{delay})*normal(avg_{travel_{time}})$$

where $queue_{length}$ represents the queue length of the incoming lane, which is the total number of vehicles with the speed less than 0.01 m/s, normal represents a dimensionless treatment of three factors by a Min-Max method, $avg\_travel_{time}$ represents an average driving time of all vehicles in the incoming lane, and avg_delay represents an average delay of the vehicles in the incoming lane, which is calculated as follows:

$$avg_{delay}=1-\frac{avg_{speed}}{speed_{limit}}$$

where avg_speed represents an average speed of all vehicles in the incoming lane, and speed_limit a maximum speed limit in the incoming lane.

Further, in step (3.2), the probability p that the lane of the direction which the vehicle enters in at the downstream intersection is under the green light is calculated as follows:

$$p=\frac{1}{4}*\left(1+\frac{t}{T}\right).$$

Further, in step (3.3), the probability that the vehicle turns left, goes straight or turns right is $p_1$, $p_2$, $p_3$, respectively, and a sum thereof is 1.

Further, in step (3), according to the estimated total expected return of keeping the current phase and the maximum total expected return of phase switching. If the maximum return of phase switching is a certain multiple β of the expected return of keeping the current phase, the phase is switched to the phase with the maximum total return of phase switching. Otherwise, the current phase is kept, where β is an empirical value.

The present application has the beneficial effects that according to the topological structure of the urban road network, the driving state of road vehicles is obtained through the C-V2X technology, and the expected returns of different phases are estimated and executed for each intersection by using the upstream and downstream relationship between intersections, thus realizing the phase allocation that maximizes the traffic returns of intersections. Its implementation method is complete and reliable, and it is more flexible than the traditional traffic signal timing solution, which is of great significance to alleviate urban traffic congestion.

DETAILED DESCRIPTION OF THE INVENTION

The present application will be described in detail with reference to the attached drawings.

Figure 1:
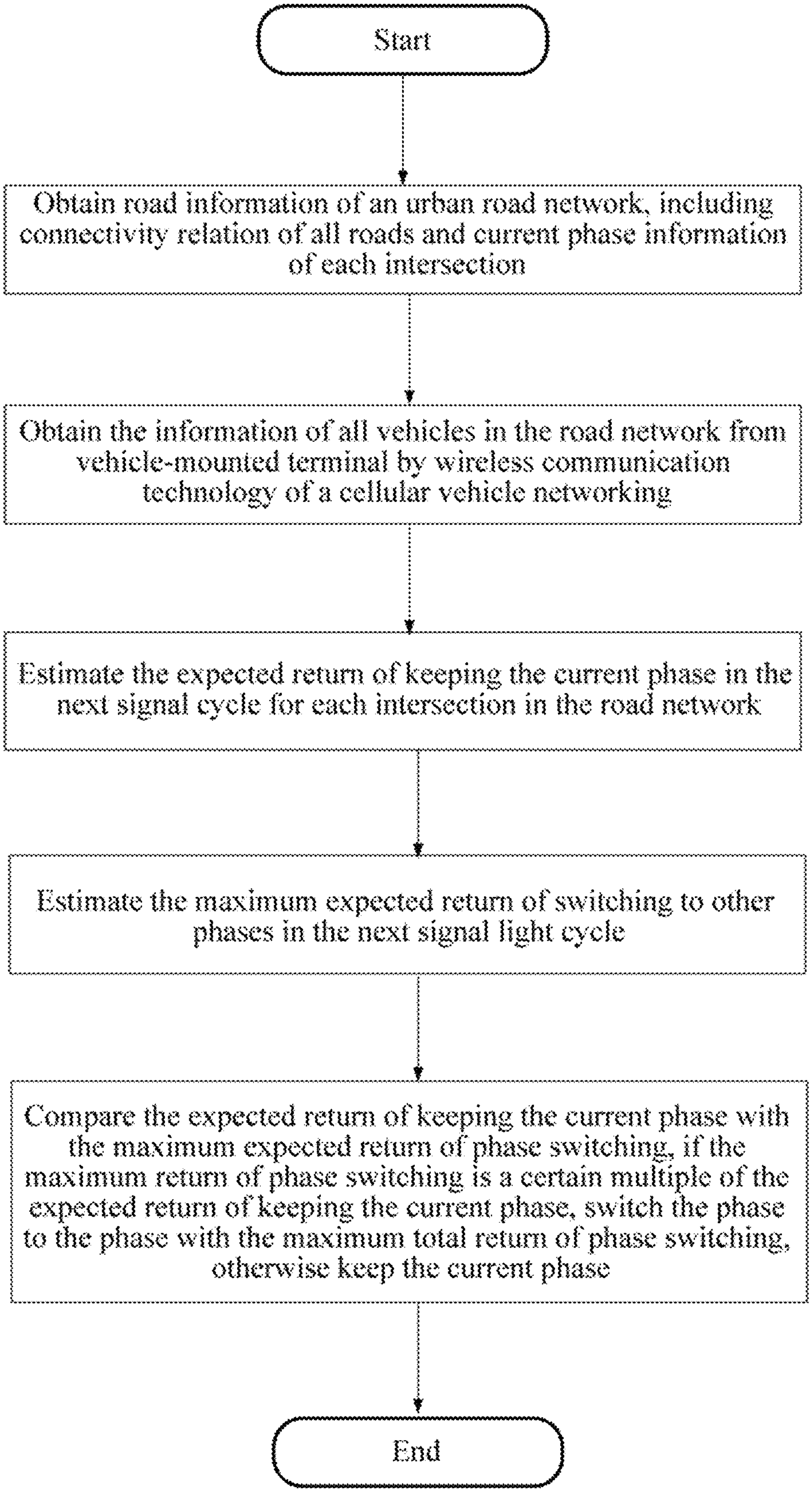
FIG. 1 is a flow chart of a traffic light control method based on expected return estimation.

As shown in FIG. 1, the present application provides a traffic light control method for an urban road network based on expected return estimation, which includes the following steps.

Figure 2:
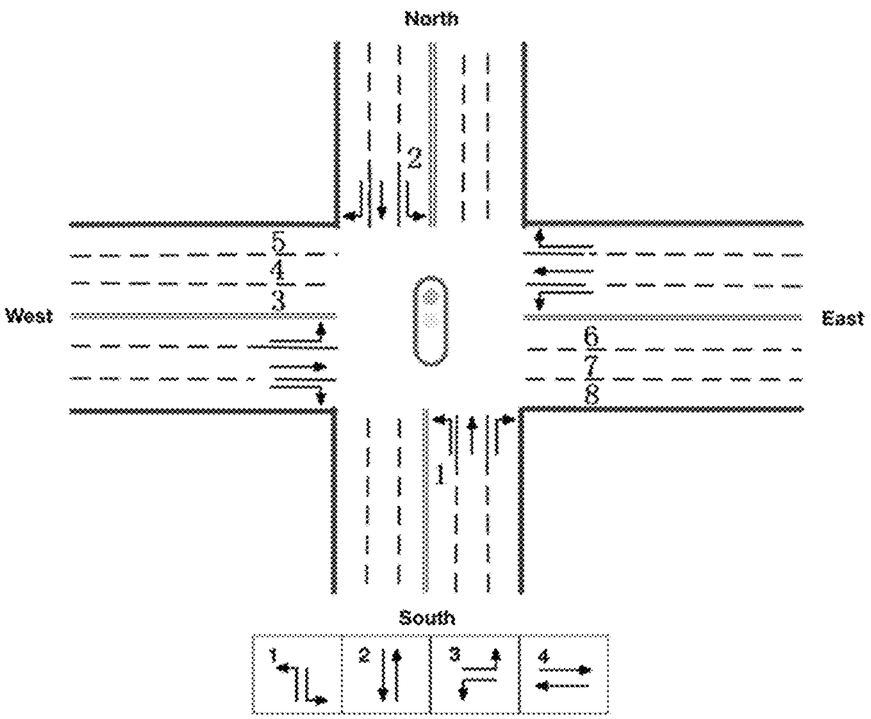
FIG. 2 is a schematic diagram of a traffic signal phase at an intersection.

Step 1: An intersection of urban roads is defined, including north-south dual-direction lanes and east-west dual-direction lanes. There are traffic lights at the intersection, including a green light and a red light. The green light allows passing, but the red light does not. The traffic lights at each intersection include four phases: phase 1: turn left on South-North direction, phase 2: go straight on South-North direction, phase 3: turn left on West-East direction, phase 4: go straight on West-East direction. Vehicles turning right are not controlled by traffic lights and can turn right at any time. Each phase includes an incoming lane and three outgoing lanes, such as phase 1. The incoming lane is two lanes numbered 1 and 2 in FIG. 2, and the outgoing lanes are six lanes numbered 3, 4, 5, 6, 7 and 8 in FIG. 2, respectively. Vehicles entering the lane in the direction of turning left in the north (the lane numbered 2 in FIG. 2) can enter the lanes corresponding to the outgoing lanes in three directions (numbered 2 in FIG. 2) of turning left, going straight and turning right (lanes numbered 6, 7 and 8 in FIG. 2). The duration of a signal cycle is T (unit, s), that is, the duration of a phase green light is T. If the phases are switched, there is a red light duration of t (unit, s), and vehicles in all phases are impassable, then the duration of the switched phase green light is T−t. The value of T herein is 30 s.

Step 2: The road information of the urban road network is obtained. The road information includes the connectivity of all roads and the current phase information of each intersection, assuming that each road includes lanes of three directions: turning left, going straight or turning right. The road information includes the length of the road, the maximum speed limit of the road (assuming that the maximum speed limits of all roads are the same), and the distance between the tail of the current road fleet and the upstream intersection.

Step 3: Using C-V2X(Cellular-V2X) wireless communication technology, the information of all vehicles in the road network is obtained from the vehicle-mounted terminal, including the position of vehicles on the road, which is expressed as the distance (unit, m) from the last intersection, and speed (unit, m/s).

Step 4: For each intersection in the road network, the phase information of the intersection is obtained. The position, speed, acceleration and road information of the vehicles on the roads connected to the current intersection are used to estimate the sum of the farthest driving distances of all vehicles in the vehicles in the incoming lane that can pass through the intersection during the green light duration, and a priority traffic index that can reflect the congestion degree of the incoming lane is introduced and multiplied with the sum of the farthest driving distances. If the executed phase of the next traffic light cycle is the same as the current phase, the green light duration of the vehicle is T, and if the executed phase of the next traffic light is different from the current phase, the green light duration of the vehicle is T−t.

Further, the third step is realized by the following substeps:

(1) Assuming that the current phase is phase and the other three switchable phases are $phase_1$, $phase_2$, $phase_3$.

(2) According to the information of the current intersection and the downstream intersection, the road information connected with the two intersections, and the information of vehicles driving on the connected roads, the expected return when the executed phase of the next traffic light cycle is the same as the current phase is estimated, that is, the expected return when the executed phase of the next traffic light cycle is phase. At this time, because the phase remains unchanged, the green light duration in the next traffic light cycle is T. For this phase, the sum of the expected returns of all the incoming lanes is calculated, and t the expected return $Reward_{keep}$ of one of the incoming lane is calculated as follows:

$$Reward_{keep}=(drive_{distance}+future_{distance})*priority_{factor}$$

where $Reward_{keep}$ indicates the expected return of an incoming lane, $drive_{distance}$ indicates the timely driving distance, $future_{distance}$ indicates the future driving distance, and $priority_{factor}$ indicates the road priority index.

$drive_{distance}$ and $future_{distance}$ are calculated as follows.

For any vehicle Veh driving in the incoming lane, assuming its driving speed is v, its acceleration is a, the maximum speed limit of the road where the vehicle Veh is located is V, the road length is $L_1$, and the distance from the upstream intersection is dis, then the distance that the vehicle still needs to travel to reach the intersection is:

$$d=L_1-dis$$

The time required for the vehicle to reach the intersection is:

$$remain_{time}=\begin{cases}\dfrac{-v+\sqrt{v^2+2a*d}}{a}, & \dfrac{V^2-v^2}{2*a}\geq d\\[2ex] \dfrac{V-v}{a}+\dfrac{d}{V}-\dfrac{V^2-v^2}{2*a*v}, & \dfrac{V^2-v^2}{2*a}<d\end{cases}$$

If $remain_{time}$, the vehicle can pass the current intersection. For all vehicles that can pass through the intersection, their driving distances in time T are calculated:

$$D_T=\begin{cases}v*T+\dfrac{a*T^2}{2}, & \dfrac{V-v}{a}\geq T\\[2ex] T*v+\dfrac{(V-v)^2}{2*a}, & \dfrac{V-v}{a}<T\end{cases}$$

For the corresponding three outgoing lanes, assuming that the road length is $L_2$, and the queue lengths of the lanes for turning left, going straight and turning right are $q_1$, $q_2$, $q_3$, respectively, the distances from the tail of the fleet to the current intersection are $L_2-q_1$, $L_2-q_2$, $L_2-q_3$, respectively.

For any vehicle that can pass through the current intersection, it is assumed that the probability of entering the lanes for turning left, going straight or turning right is $p_1$, $p_2$, $p_3$, where $p_1+p_2+p_3=1$. If the vehicle drives into the lane for turning left:

When $d+L_2-q_1\geq D_T$, then $$drive_{distance-left}=D_T$$

$$future_{distance-left}=0$$

When $d+L_2-q_1<D_T$, then $$drive_{distance-left}=d+L_2-q_1$$

$$future_{distance-left}=\alpha*p*\frac{1}{L_2-q_1}*(D_T-(d+L_2-q_1))$$

If the vehicle drives into the lane for going straight:

When $d+L_2-q_2\geq D_T$, then $$drive_{distance-through}=D_T$$

$$future_{distance-through}=0$$

When $d+L_2-q_2<D_T$, then $$drive_{distance-through}=d+L_2-q_2$$

$$future_{distance-through}=\alpha*p*\frac{1}{L_2-q_2}*(D_T-(d+L_2-q_2))$$

If the vehicle drives into the lane for turning right:

When $d+L_2-q_3 \geq D_T$, then $$drive_{distance-right} = D_T$$

$$future_{distance-right} = 0$$

When $d+L_2-q_3 < D_T$, then $$drive_{distance-right} = d+L_2-q_3$$

$$future_{distance-right} = \alpha * p * \frac{1}{L_2-q_3} * (D_T-(d+L_2-q_3))$$

where α is the loss coefficient of the future driving distance, the loss coefficient is the empirical coefficient due to the loss of the future driving distance caused by the start delay or braking of the preceding queuing vehicle, and the value here is 0.8, and p is a probability that the lane of the direction which the vehicle enters in at the downstream intersection is under a green light.

$$p = \frac{1}{4} * \left(1 + \frac{t}{T}\right)$$

Then the timely driving distance and future driving distance of all vehicles that can pass through the intersection in the outgoing lane are respectively:

$$drive_{distance} = drive_{distance-left} * p_1 + drive_{distance-through} * p_2 + drive_{distance-right} * p_3$$

$$future_{distance} = future_{distance-left} * p_1 + future_{distance-through} * p_2 + future_{distance-right} * p_3$$

The road priority index $priority_{factor}$ is calculated as follows:

$$priority_{factor} = normal(queue_{length}) * normal(avg\_delay) * normal(avg\_travel_{time})$$

$queue_{length}$ represents the queue length of the incoming lane, which is the total number of vehicles with a speed less than 0.01 m/s.

avg_delay represents the average delay of vehicles of the incoming lane, $$avg\_delay = 1 - avg\_speed/speed\_limit$$

where avg_speed indicates the average speed of all vehicles in the incoming lane, and speed_limit is the maximum speed limit in the incoming lane.

$avg\_travel_{time}$ represents the average driving time of all vehicles in the lane.

Normal means that the Min-Max method is adopted to carry out dimensionless treatment on the three factors, respectively.

The expected returns of other lanes in this phase are calculated in the same way as above. After the calculation is completed according to the above method, the total expected return of the phase is the sum of the expected returns of all incoming lanes.

(3) According to the information of the current intersection and the downstream intersection, the road information connected with the two intersections, and the information of the vehicles driving on the connected roads, the return when the phase is switched in the next traffic light cycle is estimated, that is, the expected return of any switched phase $phase_i \in \{phase_1, phase_2, phase_3\}$ is estimated. The expected return of one incoming lane is calculated as follows:

$$Reward_{change_{phase_i}} = (drive_{distance} + future_{distance}) * priority_{factor}$$

where $$Reward_{change_{phase_i}}$$

represents the expected return of $phase_i$, $drive_{distance}$ represents the corresponding timely driving distance, $future_{distance}$ represents the corresponding future driving distance, and $priority_{factor}$ represents the corresponding road priority index. $drive_{distance}$ and $future_{distance}$ are calculated as follows:

For any vehicle Veh traveling in the incoming lane, assuming its speed is v, its acceleration is a, the maximum speed limit of the road where the vehicle Veh is located is V, the length of the road is $L_1$, and the distance from the upstream intersection is dis, then the distance that the vehicle still needs to travel to reach the intersection is:

$$d = L_1 - dis$$

The time required for the vehicle to reach the intersection is:

$$remain_{time} = \begin{cases} \frac{-v+\sqrt{v^2+2a*d}}{a}, & \frac{V^2-v^2}{2*a} \geq d \\ \frac{V-v}{a} + \frac{d}{V} - \frac{V^2-v^2}{2*a*v}, & \frac{V^2-v^2}{2*a} < d \end{cases}$$

If $remain_{time} < T-t$, the vehicle can pass the current intersection. For all vehicles that can pass through the intersection, the driving distances thereof in time T−t are calculated:

$$D_T = \begin{cases} v*(T-t) + \frac{a*(T-t)^2}{2}, & \frac{V-v}{a} \geq T-t \\ (T-t)*v + \frac{(V-v)^2}{2*a}, & \frac{V-v}{a} < T-t \end{cases}$$

For the corresponding three outgoing lanes, assuming that the road length is $L_2$, and the queue length of the lane for turning left, going straight and turning right is $q_1$, $q_2$, $q_3$, respectively, the distances from the tail of the motorcade to the current intersection are $L_2-L_2-q_2$, $L_2-q_3$, respectively.

For any vehicle that can pass through the current intersection, it is assumed that the probability of entering the lane for turning left, going straight and turning right is $p_1$, $p_2$, $p_3$, where $p_1+p_2+p_3=1$. If it drives into the left turn lane:

when $d+L_2-q_1 \geq D_T$, $$drive_{distance-left} = D_T$$

$$future_{distance-left} = 0$$

when $d+L_2-q_1 < D_T$, $$drive_{distance-left} = d+L_2-q_1$$

$$future_{distance-left} = \alpha * p * \frac{1}{L_2-q_1} * (D_T-(d+L_2-q_1))$$

If it drives into the straight lane:

$$\text{when } d+L_2-q_2 \geq D_T,$$
$$\text{drive}_{distance-through} = D_T$$
$$\text{future}_{distance-through} = 0$$
$$\text{when } d+L_2-q_2 < D_T,$$
$$\text{drive}_{distance-through} = d+L_2-q_2$$
$$\text{future}_{distance-through} = \alpha * p * \frac{1}{L_2-q_2} * (D_T-(d+L_2-q_2))$$

If it drives into the right turn lane:

$$\text{when } d+L_2-q_3 \geq D_T,$$
$$\text{drive}_{distance-right} = D_T$$
$$\text{future}_{distance-right} = 0$$
$$\text{when } d+L_2-q_3 < D_T,$$
$$\text{drive}_{distance-right} = d+L_2-q_3$$
$$\text{future}_{distance-right} = \alpha * p * \frac{1}{L_2-q_2} * (D_T-(d+L_2-q_3))$$

where α is the loss coefficient of the future driving distance, the loss coefficient is the loss of future driving distance due to the start delay or braking of the preceding queuing vehicle, which is an empirical coefficient and the value of which is 0.8 in this embodiment, and p is the probability that the lane of the direction which the vehicle enters in at the downstream intersection is under the green light.

$$p = \frac{1}{4} * \left(1 + \frac{t}{T}\right)$$

Then the timely driving distance and future driving distance of all vehicles that can pass through the intersection in the outgoing lane are respectively:

$$\text{drive}_{distance} = \text{drive}_{distance\text{-}left} * p_1 + \text{drive}_{distance\text{-}through} * p_2 + \text{drive}_{distance\text{-}right} * p_3$$

$$\text{future}_{distance} = \text{future}_{distance\text{-}left} * p_1 + \text{future}_{distance\text{-}through} * p_2 + \text{future}_{distance\text{-}right} * p_3$$

The road priority index $\text{priority}_{factor}$ is calculated as follows:

$$\text{priority}_{factor} = \text{normal}(\text{queue}_{length}) * \text{normal}(\text{avg\_delay}) * \text{normal}(\text{avg\_travel}_{time})$$

$\text{queue}_{length}$ represents the queue length of the incoming lane, and is the total number of vehicles with a speed less than 0.01 m/s.

avg_delay represents the average delay of vehicles of the incoming lane, $$\text{avg\_delay} = 1 - \text{avg\_speed}/\text{speed\_limit}$$

where avg_speed indicates the average speed of all vehicles in the incoming lane, and speed_limit is the maximum speed limit in the incoming lane. $\text{avg\_travel}_{time}$ indicates the average driving time of all vehicles in the lane.

Normal means that the Min-Max method is adopted to carry out dimensionless treatment on the three factors respectively.

The expected return of other lanes of the phase $\text{phase}_i$ is calculated in the same way as above. After the calculation is completed according to the above method, the total expected return of the phase is the sum of the expected return of all incoming lanes. And the total expected returns of other phases are calculated respectively.

(4) The phase with the largest total expected return of phase switching is obtained, and the corresponding maximum total expected return is calculated.

$$\text{Reward}_{change-max} = \max\left(\text{Reward}_{change_{phase_1}}, \text{Reward}_{change_{phase_2}}, \text{Reward}_{change_{phase_3}}\right)$$

$\text{Reward}_{change-max}$ represents the maximum total expected return of phase switching, and the corresponding phase is recorded as $\text{phase}_j$.

Step 5: according to the estimated total expected return of keeping the current phase and the maximum total expected return of phase switching, if the maximum return of phase switching is a certain multiple of the expected return of keeping the current phase, the phase is switched to the phase with the maximum total return, otherwise, the current phase is kept.

Further, step 5 is realized by the following sub-steps:

$\text{Reward}_{keep}$ and $\text{Reward}_{change-max}$ values are compared.

If $\text{Reward}_{change-max} \leq \beta * \text{Reward}_{keep}$, the current phase is kept.

If $\text{Reward}_{change-max} > \beta * \text{Reward}_{keep}$, the phase to is switched to $\text{phase}_j$.

where β is an empirical value, and the value of β here is 1.6.

Figure 3:
FIG. 3 is the simulation visualization interface of a CBEngine traffic simulation engine.
Figure 4:
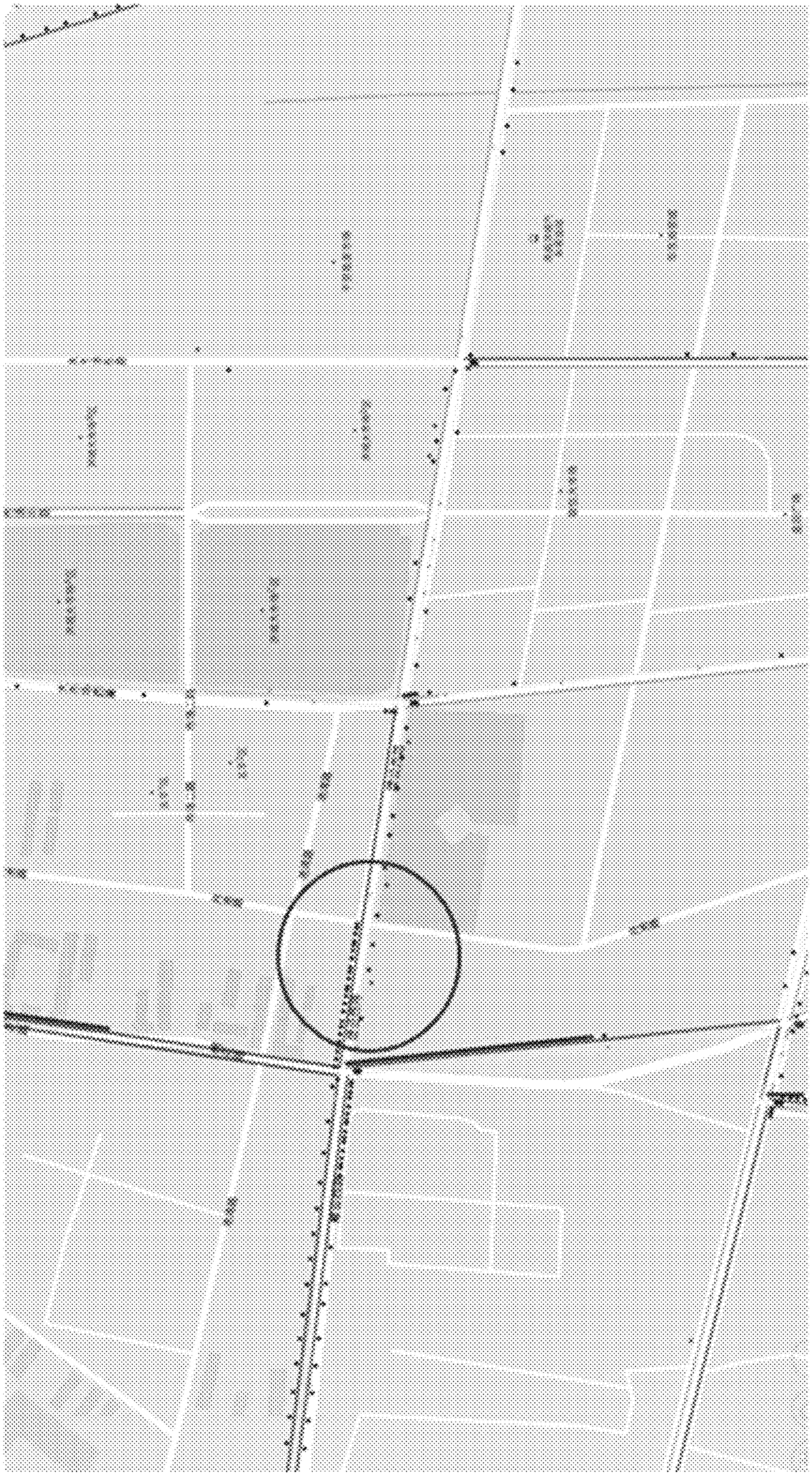
FIG. 4 is an intersection (circled intersection) in a CBEngine traffic simulation engine.

According to this method, based on the urban road network, 2024 intersections, 3010 roads and 10186 traffic flows are set in the CBEngine traffic simulation engine for simulation, as shown in FIGS. 3 and 4. In FIG. 4, a certain intersection in the CBEngine traffic simulation engine is circled, and the traffic flow in the north-south straight lane of the current road is large, so the phase 2, that is, the north-south straight traffic is executed in the next traffic light cycle. This method and the maximum pressure method are used to control the traffic lights respectively, and it is found that the delay index of this method is reduced by 23% compared with that of the maximum queuing pressure method. This method can dynamically control the phase transformation according to the real-time state of road traffic in each traffic light cycle, so that as many vehicles as possible can travel farther in the green light duration, thereby obviously alleviating traffic congestion and improving the travel experience.

The above-mentioned embodiments are used to explain, rather than limit the present application. Any modification and change made to the present application within the scope of protection of the spirit and claims of the present application shall fall within the scope of protection of the present application.

What is claimed:

1. A traffic light control method for an urban road network based on expected return estimation, comprising:

step 1, obtaining road information of the urban road network, comprising connectivity relation of all roads and current traffic light information of intersections, wherein each road comprises lanes of three directions: turning left, going straight or turning right;

wherein a traffic light at each intersection comprises four phases: phase 1: turn left on a South-North direction, phase 2: go straight on the South-North direction, phase 3: turn left on a West-East direction, and phase 4: go straight on the West-East direction; and wherein the road information comprises:

a length of a road, a maximum speed limit of all roads which are the same, and a distance between a tail of a current road fleet and an upstream intersection;

step 2, obtaining information of all vehicles in the urban road network from vehicle-mounted terminals by Cellular Vehicle Networking (Cellular-V2X or C-V2X) wireless communication technology, comprising an instantaneous speed of a vehicle and a position on the road expressed as a distance from a last intersection; and step 3, obtaining current phase information for each intersection in the urban road network, calculating a total expected return of all incoming lanes that keep a current phase in a next traffic light cycle and a maximum total expected return of all incoming lanes that switch to the other three phases, and selecting an optimal phase after comparison;

when an executed phase in the next traffic light cycle is the same as the current phase, a green light duration of the vehicle being T; and when the executed phase in the next traffic light cycle is different from the current phase, the green light duration of the vehicle being T-t, where t is a red light duration when a phase is switched;

wherein calculating the total expected return of all incoming lanes comprises:

(3.1) multiplying by a road priority index, a sum of a timely driving distance of a vehicle in a lane and a future driving distance of the vehicle, as an expected return of each incoming lane, and summing the expected returns of all incoming lanes as a total expected return of a certain phase;

wherein calculating the timely driving distance of the vehicle comprises:

calculating a distance and time that the vehicle needs to travel to reach an intersection according to a driving speed of the vehicle, an acceleration of the vehicle, the maximum speed limit of the road, the length of the road and the distance from the upstream intersection; and calculating, for all vehicles capable of passing through the intersection, a driving distance of the vehicle within the green light duration;

(3.2) adding a distance that the vehicle needs to travel to reach the intersection calculated in step (3.1) to a length of a road of an outgoing lane and subtracted a queue length of the outgoing lane corresponding to a direction of turning left, going straight or turning right;

determining whether an obtained result is less than the driving distance of the vehicle within the green light duration;

if not, the timely driving distance of the vehicle being the driving distance of the vehicle within the green light duration, and the future driving distance of the vehicle being 0; and if yes, the timely driving distance of the vehicle and the future driving distance of the vehicle being calculated as follows:

$$\text{drive}_{distance\text{-}f}=d+L_2-q_f$$

$$\text{future}_{distance-f}=\alpha*\text{p}*\frac{1}{L_2-q_f}*(D_T-(d+L_2-q_f))$$

where $\text{drive}_{distance\text{-}f}$ represents the timely driving distance of the vehicle in the outgoing lane, $\text{fUture}_{distance\text{-}f}$ represents the future driving distance of the vehicle in the outgoing lane, wherein the outgoing lane comprises lanes in three directions: turning left, going straight or turning right, which is represented by f, and the vehicle enter one of the lanes with a certain probability; $q_f$ represents the queue length of the outgoing lane; d is the distance that the vehicle still needs to travel to reach the intersection, $L_2$ is the road length of the outgoing lane, and DT is the driving distance of the vehicle within the green light duration; p is a probability that an outgoing lane which the vehicle enters in at a downstream intersection is under the green light, and a is a loss coefficient of the future driving distance, which is an empirical coefficient; and (3.3) multiplying the timely driving distance and the future driving distance of the vehicle in three directions of turning left, going straight or turning right calculated in step (3.2), by a probability that the vehicle turns left, goes straight or turns right, respectively, and calculating a sum of probabilities that the vehicle turns left, goes straight and turns right, obtain the timely driving distances and the future driving distances of all vehicles capable of passing through the intersection.

2. The traffic light control method for an urban road network based on expected return estimation according to claim 1, wherein in step 1, each intersection comprises a north-south dual-direction lane and an east-west dual-direction lane, wherein the intersection has traffic lights, and the traffic lights comprise a green light for allowing passing and a red light for forbidding passing.

3. The traffic light control method for an urban road network based on expected return estimation according to claim 1, wherein each phase comprises an incoming lane and three outgoing lanes, and the outgoing lanes comprise directions of turning left, going straight or turning right, and a vehicle to turn right is not controlled by the traffic lights and is capable of turning right at any time.

4. The traffic light control method for an urban road network based on expected return estimation according to claim 1, wherein in step (3.1), the time that the vehicle needs to travel to reach the intersection is calculated as follows:

$$\text{remain}_{time}=\begin{cases}\frac{-v+\sqrt{v^2+2a*d}}{a}, & \frac{V^2-v^2}{2*a}\geq d\\ \frac{V-v}{a}+\frac{d}{V}-\frac{V^2-v^2}{2*a*v}, & \frac{V^2-v^2}{2*a}<d\end{cases}$$

Where $\text{remain}_{time}$ represents the time that the vehicle needs to travel to reach the intersection, v is the driving speed, a is the acceleration, and V is the maximum speed limit of a road where the vehicle is located; and wherein when $\text{remain}_{time}$ is less than the green light duration, the vehicle is capable of passing the current intersection.

5. The traffic light control method for an urban road network based on expected return estimation according to claim 4, wherein in step (3.1), the driving distance of the vehicle within the green light duration is calculated as follows:

$$D_T = \begin{cases} v * T' + \frac{a * T'^2}{2}, & \frac{V - v}{a} \geq T' \\ T' * v + \frac{(V - v)^2}{2 * a}, & \frac{V - v}{a} < T' \end{cases}$$

where $D_T$ represents the vehicle within the green light duration, T' with a value of T or T−t, represents the green light duration.

6. The traffic light control method for an urban road network based on expected return estimation according to claim 1, wherein in step (3.1), the road priority index is calculated as follows:

$$priority_{factor} = normal(queue_{length}) * normal(avg\_delay) * normal(avg\_travel_{time})$$

where $priority_{factor}$ represents the road priority index, $queue_{length}$ represents a queue length of the incoming lane, the queue length of the incoming lane is the total number of a vehicle with a speed less than 0.01 m/s, normal represents a dimensionless treatment of three factors by a Min-Max method, $avg\_travel_{time}$ represents an average driving time of all vehicles in the incoming lane, and avg_delay represents an average delay of the vehicles in the incoming lane, and the avg_delay is calculated as follows:

$$avg\_delay = 1 - avg\_speed/speed\_limit$$

where avg_speed represents an average speed of all vehicles in the incoming lane, and speed_limit is a maximum speed limit in the incoming lane.

7. The traffic light control method for an urban road network based on expected return estimation according to claim 1, wherein in step (3.2), the probability p that a lane of a direction which vehicle enters in at the downstream intersection is under the green light is calculated as follows:

$$p = \frac{1}{4} * \left(1 + \frac{t}{T}\right).$$

8. The traffic light control method for an urban road network based on expected return estimation according to claim 1, wherein in step (3.3), a probability that the vehicle turns left, goes straight or turns right is $p_1$, $p_2$, $p_3$, respectively, and a sum of $p_1$, $p_2$, $p_3$ is 1.

9. The traffic light control method for an urban road network based on expected return estimation according to claim 1, wherein in step 1, based on an estimated total expected return of keeping the current phase and an estimated maximum total expected return of phase switching, when the maximum return of phase switching is a multiple B of an expected return of keeping the current phase, the current phase is switched to a phase with the maximum total return of phase switching, and otherwise, the current phase is kept, where p is an empirical value.

* * * * *